US008071661B2

(12) United States Patent
Lai et al.

(10) Patent No.: US 8,071,661 B2
(45) Date of Patent: Dec. 6, 2011

(54) BIOMEDICAL DEVICES

(75) Inventors: Yu-Chin Lai, Pittsford, NY (US); Weihong Lang, Amston, CT (US)

(73) Assignee: Bausch & Lomb Incorporated, Rochester, NY (US)

(*) Notice: Subject to any disclaimer, the term of this patent is extended or adjusted under 35 U.S.C. 154(b) by 396 days.

(21) Appl. No.: 12/329,700

(22) Filed: Dec. 8, 2008

(65) Prior Publication Data

US 2009/0156708 A1 Jun. 18, 2009

Related U.S. Application Data

(60) Provisional application No. 61/013,780, filed on Dec. 14, 2007.

(51) Int. Cl.
*G02C 7/04* (2006.01)
*G02B 1/04* (2006.01)
*C08F 18/20* (2006.01)

(52) U.S. Cl. .......... 523/107; 523/106; 524/916; 526/75; 526/245; 351/160 H

(58) Field of Classification Search ................. 523/107, 523/106; 524/916; 526/75, 245; 351/160 H
See application file for complete search history.

(56) References Cited

U.S. PATENT DOCUMENTS

| | | | |
|---|---|---|---|
| 3,408,429 A | 10/1968 | Wichterle | |
| 3,660,545 A | 5/1972 | Wichterle | |
| 4,055,378 A | 10/1977 | Feneberg et al. | |
| 4,113,224 A | 9/1978 | Clark et al. | |
| 4,122,942 A | 10/1978 | Wolfson | |
| 4,136,250 A | 1/1979 | Mueller et al. | |
| 4,143,949 A | 3/1979 | Chen | |
| 4,153,641 A | 5/1979 | Deichert et al. | |
| 4,197,266 A | 4/1980 | Clark et al. | |
| 4,214,014 A | 7/1980 | Höfer et al. | |
| 4,312,575 A | 1/1982 | Peyman et al. | |
| 4,440,918 A | 4/1984 | Rice et al. | |
| 4,555,732 A | 11/1985 | Tuhro | |
| 4,632,844 A | 12/1986 | Yanagihara et al. | |
| 4,650,843 A | 3/1987 | Yokoyama et al. | |
| 4,740,533 A | 4/1988 | Su et al. | |
| 4,910,277 A | 3/1990 | Bambury et al. | |
| 4,954,587 A | 9/1990 | Mueller | |
| 4,990,582 A | 2/1991 | Salamone | |
| 4,996,275 A | 2/1991 | Ellis et al. | |
| 5,010,141 A | 4/1991 | Mueller | |
| 5,034,461 A | 7/1991 | Lai et al. | |
| 5,070,215 A | 12/1991 | Bambury et al. | |
| 5,079,319 A | 1/1992 | Mueller | |
| 5,162,469 A | 11/1992 | Chen | |
| 5,260,000 A | 11/1993 | Nandu et al. | |
| 5,271,875 A | 12/1993 | Appleton et al. | |
| 5,310,779 A | 5/1994 | Lai | |
| 5,321,108 A | 6/1994 | Künzler et al. | |
| 5,358,995 A | 10/1994 | Lai et al. | |
| 5,387,662 A | 2/1995 | Künzler et al. | |
| 5,449,729 A | 9/1995 | Lai | |
| 5,512,205 A | 4/1996 | Lai | |
| 5,610,252 A | 3/1997 | Bambury et al. | |
| 5,616,757 A | 4/1997 | Bambury | |
| 5,700,559 A | 12/1997 | Sheu et al. | |
| 5,705,583 A | 1/1998 | Bowers et al. | |
| 5,708,094 A | 1/1998 | Lai et al. | |
| 5,710,302 A | 1/1998 | Künzler et al. | |
| 5,714,557 A | 2/1998 | Künzler et al. | |
| 5,908,906 A | 6/1999 | Künzler et al. | |
| 6,440,571 B1 | 8/2002 | Valint, Jr. et al. | |
| 6,599,559 B1 | 7/2003 | McGee et al. | |
| 6,638,563 B2 | 10/2003 | McGee et al. | |
| 7,083,646 B2 | 8/2006 | Valint, Jr. et al. | |
| 7,084,188 B2 | 8/2006 | Lai et al. | |
| 7,176,268 B2 | 2/2007 | Lai et al. | |
| 2003/0068433 A1 | 4/2003 | McGee et al. | |
| 2007/0264503 A1 | 11/2007 | Lai et al. | |

FOREIGN PATENT DOCUMENTS

| | | |
|---|---|---|
| JP | 03 196118 | 8/1991 |
| WO | WO 95/04609 | 2/1995 |
| WO | WO 96/31792 | 10/1996 |

OTHER PUBLICATIONS

Lai, Yu-Chin, "The Role of Bulky Polysiloxanylalkyl Methacryates in Polyurethane-Polysiloxane Hydrogels", *Journal of Applied Polymer Science*, vol. 60, 1193-1199 (1996).

*Primary Examiner* — Tae H Yoon
(74) *Attorney, Agent, or Firm* — John E. Thomas

(57) ABSTRACT

Biomedical devices are provided herein which are formed from a polymerization product of a mixture comprising (a) a copolymer which is the reaction product of one or more polymerizable polyhydric alcohols and one or more polymerizable fluorine-containing monomers; and (b) a biomedical device-forming comonomer.

20 Claims, No Drawings

BIOMEDICAL DEVICES

This application claims the benefit of Provisional Patent Application No. 61/013,780 filed on Dec. 14, 2007 which is incorporated by reference herein.

BACKGROUND OF THE INVENTION

1. Technical Field

The present invention generally relates to biomedical devices, and especially ophthalmic devices that are intended for direct placement on or in the eye such as contact lenses or intraocular lenses.

2. Description of Related Art

In the field of biomedical devices such as contact lenses, various physical and chemical properties such as, for example, oxygen permeability, wettability, material strength and stability, must be carefully balanced in order to provide a useable contact lens. For example, since the cornea receives its oxygen supply exclusively from contact with the atmosphere, good oxygen permeability is a critical characteristic for any contact lens material. Wettability also is important in that, if the lens is not sufficiently wettable, it does not remain lubricated and therefore cannot be worn comfortably in the eye. Accordingly, the optimum contact lens would have at least both excellent oxygen permeability and excellent tear fluid wettability.

Contact lenses made from fluorinated materials have been investigated for a number of years. Such materials can generally be subdivided into two major classes, namely hydrogels and non-hydrogels. Hydrogels can absorb and retain water in an equilibrium state whereas non-hydrogels do not absorb appreciable amounts of water. Regardless of their water content, both hydrogel and non-hydrogel fluorinated contact lenses tend to have relatively hydrophobic, non-wettable surfaces.

By introducing fluorine-containing groups into contact lens polymers, the oxygen permeability can be significantly increased. For example, U.S. Pat. No. 4,996,275 discloses using a mixture of comonomers including the fluorinated compound bis(1,1,1,3,3,3-hexafluoro-2-propyl)itaconate in combination with organosiloxane components. Fluorinating certain polysiloxane materials has been indicated to reduce the accumulation of deposits on contact lenses made from such materials. See, for example, U.S. Pat. Nos. 4,440,918; 4,954,587; 4,990,582; 5,010,141 and 5,079,319. However, fluorinated polymers can suffer from one or more of the following drawbacks: difficult and/or expensive synthetic routes, poor processability, low refractive index, poor wettability, poor optical clarity, poor miscibility with other monomers/reagents and toxicity.

Another example of introducing fluorine-containing groups into contact lens polymers is U.S. Pat. No. 4,650,843 which discloses a soft contact lens obtained by subjecting, to casting polymerization, a composition containing (a) 50 to 95% by weight of a monomethacrylate of an alkylene glycol, (b) 5 to 35% by weight of a fluorine containing monomer, and (c) 0.3 to 40% by weight of one or more compound selected from the group consisting of acrylic acid, methacrylic acid, itaconic acid, glyceryl methacrylate, monomethacrylate of pentaerythritol and an alkyl methacrylate.

U.S. Pat. No. 5,162,469 discloses a one pot synthesis for making contact lenses. The '469 patent further discloses that the contact lenses are obtained from a copolymer containing, by weight, from about 5 to about 85 percent of a polymerizable fluoromonomer, and from about 5 to about 75 percent of a polymerizable hydrolyzable silicone monomer. The copolymer can further include glyceryl methacrylate.

Glyceryl methacrylate is a hydrophilic monomer capable of absorbing a high amount of water and form high water content hydrogels when cured and hydrated. However, glyceryl methacrylate is not very compatible with monomers such as silicone-containing monomers when polymerizing glyceryl methacrylate with the silicone-containing monomer to form a silicone hydrogel. Accordingly, it would be desirable to provide improved biomedical devices using glyceryl methacrylate that exhibit suitable physical properties, e.g., modulus and tear strength, and chemical properties, e.g., oxygen permeability and wettability, for prolonged contact with the body while also being biocompatible.

SUMMARY OF THE INVENTION

In accordance with one embodiment of the present invention, a biomedical device is provided which is obtained from a polymerization product of a mixture comprising (a) a copolymer which is the reaction product of one or more polymerizable polyhydric alcohols and one or more polymerizable fluorine-containing monomers; and (b) a biomedical device-forming comonomer.

In accordance with a second embodiment of the present invention, a contact lens is provided which is obtained from a polymerization product of a mixture comprising (a) a copolymer which is the reaction product of one or more polymerizable polyhydric alcohols and one or more polymerizable fluorine-containing monomers; and (b) a contact lens-forming comonomer.

In accordance with a third embodiment of the present invention, a biomedical device is provided which is obtained from a polymerization product of a mixture comprising (a) a copolymer which is the reaction product of one or more polymerizable polyhydric alcohols and one or more polymerizable fluorine-containing monomers and wherein the copolymer is terminated with an ethylenically unsaturated-containing radical; and (b) a biomedical device-forming comonomer.

The biomedical devices such as a hydrogel lens of the present invention derived from at least a reaction product of a polymerizable polyhydric alcohol and polymerizable fluorine-containing monomer advantageously possess deposit resistance as well as water retention thereby resulting in improved wear comfort of the lens.

DETAILED DESCRIPTION OF THE PREFERRED EMBODIMENTS

The present invention is directed to biomedical devices intended for direct contact with body tissue or fluid. Representative examples of biomedical devices include, but are not limited to, artificial ureters, diaphragms, intrauterine devices, heart valves, catheters, denture liners, prosthetic devices, ophthalmic lens applications, where the lens is intended for direct placement in or on the eye, such as, for example, intraocular devices and contact lenses, and the like. These devices can provide optical correction, wound care, drug delivery, diagnostic functionality or cosmetic enhancement or effect or a combination of these properties. As used herein, the term "ophthalmic device" refers to devices that reside in or on the eye. Useful ophthalmic devices include, but are not limited to, ophthalmic lenses such as soft contact lenses, e.g., a soft, hydrogel lens; soft, non-hydrogel lens and the like, hard contact lenses, e.g., a hard, gas permeable lens material and the like, intraocular lenses, overlay lenses, ocular inserts, optical inserts and the like. As is understood by one skilled in the art, a lens is considered to be "soft" if it can be folded back upon itself without breaking. The preferred biomedical devices are ophthalmic devices, preferably contact lenses, and most preferably contact lenses made from silicone hydrogels.

The biomedical devices of the present invention are formed from a polymerization product of a mixture containing at least (a) a copolymer which is the reaction product of one or more polymerizable polyhydric alcohols and one or more polymerizable fluorine-containing monomers; and (b) a biomedical device-forming comonomer. Suitable polymerizable polyhydric alcohols for use in forming the copolymer of component (a) of the mixture include polyhydric alcohols having one or more polymerizable ethylenically unsaturated-containing radicals attached thereto. Representative examples of a "polymerizable ethylenically unsaturated-containing radical" include, by way of example, (meth)acrylate-containing radicals, (meth)acrylamide-containing radicals, vinylcarbonate-containing radicals, vinylcarbamate-containing radicals, styrene-containing radicals, itaconate-containing radicals, vinyl-containing radicals, vinyloxy-containing radicals, fumarate-containing radicals, maleimide-containing radicals, vinylsulfonyl radicals and the like. As used herein, the term "(meth)" denotes an optional methyl substituent. Thus, for example, terms such as "(meth)acrylate" denotes either methacrylate or acrylate, and "(meth)acrylamide" denotes either methacrylamide or acrylamide.

In one embodiment, a polymerizable ethylenically unsaturated radical can be represented by the general formula:

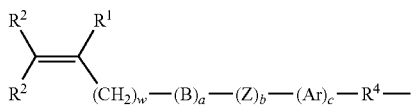

wherein $R^1$ is hydrogen or a alkyl group having 1 to 6 carbon atoms such as methyl; each $R^2$ is independently hydrogen, an alkyl radical having 1 to 6 carbon atoms, or a —CO—Y—$R^5$ radical wherein Y is —O—, —S— or —NH— and $R^5$ is an alkyl radical having 1 to about 10 carbon atoms; $R^4$ is a linking group (e.g., a divalent alkenyl radical having 1 to about 12 carbon atoms); B denotes —O— or —NH—; Z denotes —CO—, —OCO— or —COO—; Ar denotes an aromatic radical having 6 to about 30 carbon atoms; w is 0 to 6; a is 0 or 1; b is 0 or 1; and c is 0 or 1. The ethylenically unsaturated-containing radicals can be attached to the polyhydric alcohols as pendent groups, terminal groups or both.

Representative examples of suitable polymerizable polyhydric alcohols include polyhydroxyl(alk)acrylates having, for example, 2 to 10 hydroxyl groups and preferably 2 to 6 hydroxyl groups and a straight or branched alkyl group containing from 3 to 12 carbon atoms, polyhydroxyl(alk)acrylamides having, for example, 2 to 10 hydroxyl groups and preferably 2 to 6 hydroxyl groups and a straight or branched alkyl group containing from 3 to 12 carbon atoms and the like. Useful polyhydroxyl(alk)acrylates include, but are not limited to, glycerol-containing -acrylates -methacrylates, and -ethacrylates, sorbitol-containing -acrylates, -methacrylates and -ethacrylates, erythritol-containing -acrylates, -methacrylates, and -thacrylates, xylitol-containing -acrylates, -methacrylates, -ethacrylates, derivatives thereof and the like and mixtures thereof. Useful polyhydroxyl(alk)acrylamides include, but are not limited to, glycerol-containing -acrylamides, -methacrylamides and -ethacrylamides, sorbitol-containing -acrylamides, -methacrylamides and -ethacrylamides, erythritol-containing -acrylamides, -methacrylamides and -ethacrylamides, xylitol-containing -acrylamides, -methacrylamides and -ethacrylamides, derivatives thereof and the like and mixtures thereof. In one embodiment, a polyhydric alcohol is glycerol methacrylate.

Suitable fluorine-containing monomers for use in forming the copolymer of component (a) of the mixture include fluorine-containing monomers having one or more polymerizable ethylenically unsaturated-containing radicals attached thereto. Representative examples of a "polymerizable ethylenically unsaturated-containing radical" include, by way of example, (meth)acrylate-containing radicals, (meth)acrylamide-containing radicals, vinylcarbonate-containing radicals, vinylcarbamate-containing radicals, styrene-containing radicals, itaconate-containing radicals, vinyl-containing radicals, vinyloxy-containing radicals, fumarate-containing radicals, maleimide-containing radicals, vinylsulfonyl radicals and the like and as exemplified for the polyhydric alcohol discussed above. The ethylenically unsaturated-containing radicals can be attached to the fluorine-containing monomer as pendent groups, terminal groups or both. In one embodiment, useful polymerizable fluorine-containing monomers include fluorine substituted hydrocarbons having one or more polymerizable ethylenically unsaturated-containing radicals attached thereto and optionally containing one or more ether linkages, e.g., fluorine substituted straight or branched $C_1$-$C_{18}$ alkyl groups having one or more polymerizable ethylenically unsaturated-containing radicals attached thereto which may include ether linkages therebetween; fluorine substituted $C_3$-$C_{24}$ cycloalkyl groups having one or more polymerizable ethylenically unsaturated-containing radicals attached thereto which may include ether linkages therebetween; fluorine substituted $C_5$-$C_{30}$ aryl groups having one or more polymerizable ethylenically unsaturated-containing radicals attached thereto which may include ether linkages therebetween and the like.

Representative examples of alkyl groups for use herein include, by way of example, a straight or branched hydrocarbon chain radical containing carbon and hydrogen atoms of from 1 to about 18 carbon atoms with or without unsaturation, to the rest of the molecule, e.g., methyl, ethyl, n-propyl, 1-methylethyl(isopropyl), n-butyl, n-pentyl, etc., and the like.

Representative examples of cycloalkyl groups for use herein include, by way of example, a substituted or unsubstituted non-aromatic mono or multicyclic ring system of about 3 to about 24 carbon atoms such as, for example, cyclopropyl, cyclobutyl, cyclopentyl, cyclohexyl, perhydronapthyl, adamantyl and norbornyl groups bridged cyclic group or spirirobicyclic groups, e.g., sprio-(4,4)-non-2-yl and the like, optionally containing one or more heteroatoms, e.g., O and N, and the like.

Representative examples of aryl groups for use herein include, by way of example, a substituted or unsubstituted monoaromatic or polyaromatic radical containing from about 5 to about 30 carbon atoms such as, for example, phenyl, naphthyl, tetrahydronapthyl, indenyl, biphenyl and the like, optionally containing one or more heteroatoms, e.g., O and N, and the like.

Examples of suitable polymerizable fluorine-containing monomers include, but are not limited to, 2,2,2-trifluoroethyl (meth)acrylate, 2,2,3,3-tetrafluoropropyl(meth)acrylate, 2,2, 3,3,3,-pentafluoropropyl(meth)acrylate, 1-trifluoromethyl-2, 2,2-trifluoroethyl(meth)acrylate, 1H,1H,5H-octafluoropentyl(meth)acrylate, hexafluoroisopropyl(meth) acrylate, 2,2,3,3,4,4-hexafluorobutyl(meth)acrylate, pentafluorophenyl(meth)acrylate, pentafluorohexyl(meth) acrylate and the like and mixtures thereof.

The copolymers disclosed herein can be obtained by copolymerizing at least one or more polymerizable polyhydric alcohols and one or more polymerizable fluorine-containing monomers by conventional techniques for polymerization, typically thermal or photochemical polymerization. For thermal polymerization, microwave radiation may be used. The temperature employed during thermal polymerization can range from about 40° C. to about 120° C., and typically about 50° C to about 100° C. is used. For photochemical polymerization, radiation such as gamma, ultraviolet (UV) or visible, may be used.

Polymerization is generally performed in a reaction medium such as, for example, a solution or dispersion using a solvent, e.g., water, an alkanol containing from 1 to 12 carbon atoms such as methanol, ethanol, isopropanol, propan-2-ol, t-butanol, t-amyl alcohol, n-hexanol, nonanol and the like, cyclic ethers such as tetrahydrofuran and the like, aromatic hydrocarbons such as toluene and the like. Alternatively, a mixture of any of the above solvents may be used.

A polymerization initiator may be included in the mixture to facilitate the polymerization step. Representative free radical thermal polymerization initiators are usually peroxides or azo initiators such as, for example, acetal peroxide, lauroyl peroxide, decanoyl peroxide, stearoyl peroxide, benzoyl peroxide, tertiarylbutyl peroxypivalate, peroxydicarbonate, 2,2'-azo-bis(2-methylpropionitrile), benzoin methyl ether and the like and mixtures thereof. Representative UV initiators are those known in the field such as, for example, benzoin methyl ether, benzoin ethyl ether, Darocure 1173, 1164, 2273, 1116, 2959, 3331 (EM Industries) and Igracure 651 and 184 (Ciba-Geigy), and the like and mixtures thereof. Other polymerization initiators which may be used are disclosed in, for example, "Polymer Handbook", 4th edition, Ed. J. Brandrup, E. H. Immergut, E. A. Grulke, A. Abe and D. R. Bloch, Pub. Wiley-Interscience, New York, 1998. Generally, the initiator will be employed in the mixture at a concentration at about 0.1 to about 5 percent by weight of the total mixture.

Generally, polymerization can be carried out for about 1 hour to about 72 hours and under an inert atmosphere of, for example, nitrogen or argon. If desired, the resulting polymer can be dried under vacuum, e.g., for about 1 to about 72 hours or left in an aqueous solution prior to use. The resulting reaction product can have a number average molecular weight from about 500 to about 500,000 and preferably from about 1000 to about 200,000.

The precise proportion and nature of the various comonomers used to prepare a copolymer disclosed herein may be adjusted to provide a copolymer which is particularly suitable for use in forming a biomedical device according to the present invention. Generally, the one or more polymerizable polyhydric alcohols will be present in the copolymer-forming mixture which is subjected to polymerization to provide a copolymer according to the invention in an amount of at least about 10 weight percent and preferably from about 30 to about 80 weight percent, based on the total weight of the copolymer-forming mixture. The one or more polymerizable fluorine-containing monomers will be present in the mixture which is subjected to polymerization to provide a copolymer according to the invention in an amount of not more than about 50 weight percent and preferably from about 10 weight percent to about 30 weight percent, based on the total weight of the copolymer-forming mixture.

If desired, the copolymer can be endcapped with a suitable endcapping group as known in the art. Examples of suitable end-capping groups include isocyanatoethyl methacrylate ("IEM"), methacrylic anhydride, methacryloyl chloride, vinylbenzoyl chloride, and the like, to produce a copolymer having one or more terminal polymerizable olefinic groups bonded to the copolymer through linking moieties such as a carbamate or ester group.

In addition to the copolymer, the mixture will further contain one or more biomedical device-forming comonomers. Generally, the biomedical device-forming comonomer contains at least one polymerizable group. In one embodiment, the biomedical device-forming comonomer is an ophthalmic device-forming comonomer such as a contact lens-forming comonomer. In another embodiment, the biomedical device-forming comonomer is a silicone-containing monomer. Applicable silicone-containing monomers for use in the formation of contact lenses such as silicone hydrogels are well known in the art and numerous examples are provided in, for example, U.S. Pat. Nos. 4,136,250; 4,153,641; 4,740,533; 5,034,461; 5,070,215; 5,260,000; 5,310,779; and 5,358,995.

Representative examples of applicable silicon-containing monomeris include bulky polysiloxanylalkyl(meth)acrylic monomers. An example of a bulky polysiloxanylalkyl(meth) acrylic monomer is represented by the structure of Formula I:

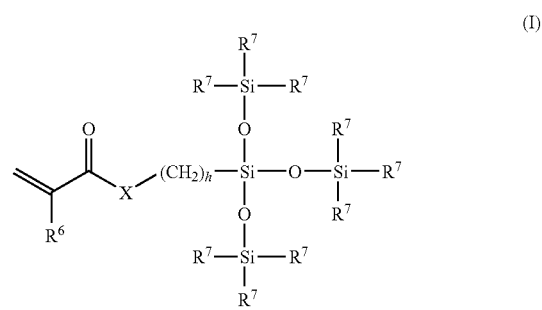

(I)

wherein X denotes —O— or —NR— wherein R denotes hydrogen or a $C_1$-$C_4$ alkyl; each $R^6$ independently denotes hydrogen or methyl; each $R^7$ independently denotes a lower alkyl radical, phenyl radical or a group represented by

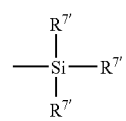

wherein each $R^{7'}$ independently denotes a lower alkyl or phenyl radical; and h is 1 to 10.

Representative examples of other applicable silicon-containing monomers includes, but are not limited to, bulky polysiloxanylalkyl carbamate monomers as generally depicted in Formula Ia:

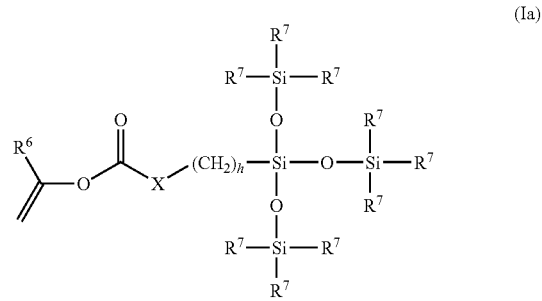

(Ia)

wherein X denotes —NR—; wherein R denotes hydrogen or a $C_1$-$C_4$ alkyl; $R^6$ denotes hydrogen or methyl; each $R^7$ independently denotes a lower alkyl radical, phenyl radical or a group represented by

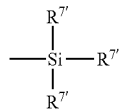

wherein each $R^{7'}$ independently denotes a lower alkyl or phenyl radical; and h is 1 to 10, and the like.

Examples of bulky monomers are 3-methacryloyloxypropyltris(trimethyl-siloxy)silane or tris(trimethylsiloxy)silylpropyl methacrylate, sometimes referred to as TRIS and tris(trimethylsiloxy)silylpropyl vinyl carbamate, sometimes referred to as TRIS-VC and the like and mixtures thereof.

Such bulky monomers may be copolymerized with a silicone macromonomer, which is a poly(organosiloxane) capped with an unsaturated group at two or more ends of the molecule. U.S. Pat. No. 4,153,641 discloses, for example, various unsaturated groups such as acryloxy or methacryloxy groups.

Another class of representative silicone-containing monomers includes, but is not limited to, silicone-containing vinyl carbonate or vinyl carbamate monomers such as, for example, 1,3-bis[4-vinyloxycarbonyloxy)but-1-yl]tetramethyldisiloxane; 3-(trimethylsilyl)propyl vinyl carbonate; 3-(vinyloxycarbonylthio)propyl-[tris(trimethylsiloxy)silane]; 3-[tris(trimethylsiloxy)silyl]propyl vinyl carbamate; 3-[tris(trimethylsiloxy)silyl]propyl allyl carbamate; 3-[tris(trimethylsiloxy)silyl]propyl vinyl carbonate; t-butyldimethylsiloxyethyl vinyl carbonate; trimethylsilylethyl vinyl carbonate; trimethylsilylmethyl vinyl carbonate and the like.

Another class of silicon-containing monomers includes polyurethane-polysiloxane macromonomers (also sometimes referred to as prepolymers), which may have hard-soft-hard blocks like traditional urethane elastomers. Examples of silicone urethanes are disclosed in a variety or publications, including Lai, Yu-Chin, "The Role of Bulky Polysiloxanylalkyl Methacryates in Polyurethane-Polysiloxane Hydrogels," *Journal of Applied Polymer Science*, Vol. 60, 1193-1199 (1996). PCT Published Application No. WO 96/31792 also discloses examples of such monomers, the contents of which are hereby incorporated by reference in its entirety. Further examples of silicone urethane monomers are represented by Formulae II and III:

$$E(*D*A*D*G)_a*D*A*D*E'; \text{ or} \qquad (II)$$

$$E(*D*G*D*A)_a*D*A*D*E'; \text{ or} \qquad (III)$$

wherein:
D denotes an alkyl diradical, an alkyl cycloalkyl diradical, a cycloalkyl diradical, an aryl diradical or an alkylaryl diradical having 6 to about 30 carbon atoms;
G denotes an alkyl diradical, a cycloalkyl diradical, an alkyl cycloalkyl diradical, an aryl diradical or an alkylaryl diradical having 1 to about 40 carbon atoms and which may contain ether, thio or amine linkages in the main chain;
* denotes a urethane or ureido linkage;
a is at least 1;
A denotes a divalent polymeric radical of Formula IV:

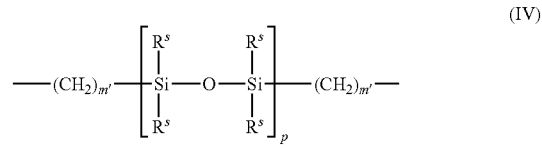

wherein each $R^S$ independently denotes an alkyl or fluoro-substituted alkyl group having 1 to about 10 carbon atoms which may contain ether linkages between the carbon atoms; m' is at least 1; and p is a number that provides a moiety weight of about 400 to about 10,000;
each of E and E' independently denotes a polymerizable unsaturated organic radical represented by Formula V:

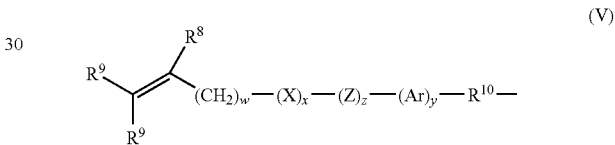

wherein: $R^8$ is hydrogen or methyl;
$R^9$ is independently hydrogen, an alkyl radical having 1 to 6 carbon atoms, or a —CO—Y—$R^{11}$ radical wherein Y is —O—, —S— or —NH—;
$R^{10}$ is a divalent alkylene radical having 1 to about 10 carbon atoms;
$R^{11}$ is a alkyl radical having 1 to about 12 carbon atoms;
X denotes —CO— or —OCO—;
Z denotes —O— or —NH—;
Ar denotes an aromatic radical having about 6 to about 30 carbon atoms;
w is 0 to 6; x is 0 or 1; y is 0 or 1; and z is 0 or 1.

A preferred silicone-containing urethane monomer is represented by Formula VI:

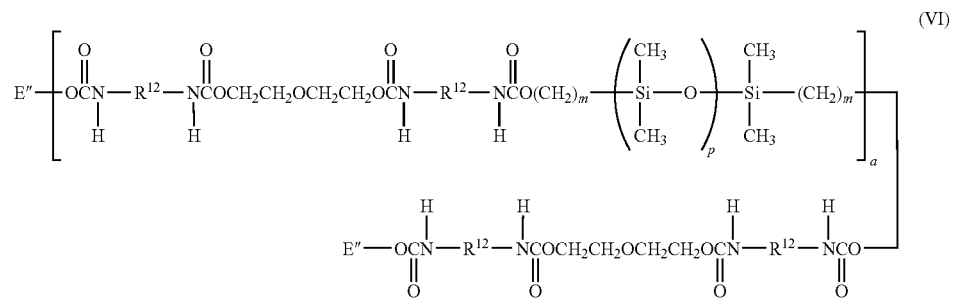

wherein m is at least 1 and is preferably 3 or 4, a is at least 1 and preferably is 1, p is a number which provides a moiety weight of about 400 to about 10,000 and is preferably at least about 30, $R^{12}$ is a diradical of a diisocyanate after removal of the isocyanate group, such as the diradical of isophorone diisocyanate, and each E" is a group represented by:

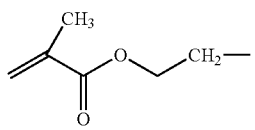

Another class of representative silicone-containing monomers includes fluorinated monomers. Such monomers have been used in the formation of fluorosilicone hydrogels to reduce the accumulation of deposits on contact lenses made therefrom, as described in, for example, U.S. Pat. Nos. 4,954,587; 5,010,141 and 5,079,319. The use of silicone-containing monomers having certain fluorinated side groups, i.e., —($CF_2$)—H, have been found to improve compatibility between the hydrophilic and silicone-containing monomeric units, see, e.g., U.S. Pat. Nos. 5,321,108 and 5,387,662.

The above silicone materials are merely exemplary, and other materials for use in forming biomedical devices according to the present invention and have been disclosed in various publications and are being continuously developed for use in contact lenses and other biomedical devices can also be used. For example, a biomedical device-forming comonomer can be a cationic monomer such as cationic silicone-containing monomer or cationic fluorinated silicone-containing monomers.

The mixtures can also contain one or more hydrophilic monomers. Suitable hydrophilic monomers include one or more unsaturated carboxylic acids, vinyl lactams, amides, polymerizable amines, vinyl carbonates, vinyl carbamates, oxazolone monomers, and the like and mixtures thereof. Useful unsaturated carboxylic acids include methacrylic acid or acrylic acid. Useful amides include acrylamides such as N,N-dimethylacrylamide and N,N-dimethylmethacrylamide. Useful vinyl lactams include cyclic lactams such as N-vinyl-2-pyrrolidone. Examples of other hydrophilic monomers include poly(alkene glycols) functionalized with polymerizable groups. Examples of useful functionalized poly(alkene glycols) include poly(diethylene glycols) of varying chain length containing monomethacrylate or dimethacrylate end caps. In a preferred embodiment, the poly(alkene glycol) polymer contains at least two alkene glycol monomeric units. Still further examples are the hydrophilic vinyl carbonate or vinyl carbamate monomers disclosed in U.S. Pat. No. 5,070,215, and the hydrophilic oxazolone monomers disclosed in U.S. Pat. No. 4,910,277. Other suitable hydrophilic monomers will be apparent to one skilled in the art. The hydrophilic monomers can be present in the monomeric mixtures in an amount ranging from 0 to about 70 weight percent, based on the total weight of the mixture.

The mixtures can further contain one or more hydrophobic monomers. Suitable hydrophobic monomers include $C_1$-$C_{20}$ alkyl and $C_3$-$C_{20}$ cycloalkyl (meth)acrylates, substituted and unsubstituted $C_6$-$C_{30}$ aryl(meth)acrylates, (meth)acrylonitriles, fluorinated alkyl methacrylates, long-chain acrylamides such as octyl acrylamide, and the like. The hydrophobic monomers can be present in the monomeric mixtures in an amount ranging from 0 to about 30 weight percent, based on the total weight of the mixture.

The mixtures can further contain one or more crosslinking monomers. The crosslinking monomer may be a material having multiple polymerizable functionalities, preferably vinyl functionalities. Representative examples of crosslinking monomers include divinylbenzene; allyl methacrylate; ethyleneglycol di(meth)acrylate, tetraethyleneglycol di(meth)acrylate, polyethyleneglycol di(meth)acrylate; vinylcarbonate derivatives of the glycol di(meth)acrylates and the like. The crosslinking monomers can be present in the monomeric mixtures in an amount ranging from 0 to about 40 weight percent, based on the total weight of the mixture.

The biomedical devices of the present invention, e.g., contact lenses or intraocular lenses, can be prepared by polymerizing the foregoing monomeric mixtures to form a product that can be subsequently formed into the appropriate shape by, for example, lathing, injection molding, compression molding, cutting and the like. For example, in producing contact lenses, the initial monomeric mixture may be polymerized in tubes to provide rod-shaped articles, which are then cut into buttons. The buttons may then be lathed into contact lenses.

Alternately, the contact lenses may be cast directly in molds, e.g., polypropylene molds, from the monomeric mixtures, e.g., by spincasting and static casting methods. Spincasting methods are disclosed in U.S. Pat. Nos. 3,408,429 and 3,660,545, and static casting methods are disclosed in U.S. Pat. Nos. 4,113,224, 4,197,266, and 5,271,875. Spincasting methods involve charging the monomer mixture to a mold, and spinning the mold in a controlled manner while exposing the monomer mixture to a radiation source such as UV light. Static casting methods involve charging the monomeric mixture between two mold sections, one mold section shaped to form the anterior lens surface and the other mold section shaped to form the posterior lens surface, and curing the monomeric mixture while retained in the mold assembly to form a lens, for example, by free radical polymerization of the monomeric mixture. Examples of free radical reaction techniques to cure the lens material include thermal radiation, infrared radiation, electron beam radiation, gamma radiation, ultraviolet (UV) radiation, and the like; or combinations of such techniques may be used. U.S. Pat. No. 5,271,875 describes a static cast molding method that permits molding of a finished lens in a mold cavity defined by a posterior mold and an anterior mold. As an additional method, U.S. Pat. No. 4,555,732 discloses a process where an excess of a monomeric mixture is cured by spincasting in a mold to form a shaped article having an anterior lens surface and a relatively large thickness, and the posterior surface of the cured spincast article is subsequently lathed to provide a contact lens having the desired thickness and posterior lens surface.

Polymerization may be facilitated by exposing the mixture to heat and/or radiation, such as ultraviolet light, visible light, or high energy radiation. A polymerization initiator may be included in the mixture to facilitate the polymerization step. Representative examples of free radical thermal polymerization initiators include organic peroxides such as acetal peroxide, lauroyl peroxide, decanoyl peroxide, stearoyl peroxide, benzoyl peroxide, tertiarylbutyl peroxypivalate, peroxydicarbonate, and the like. Representative UV initiators are those known in the art and include benzoin methyl ether, benzoin ethyl ether, Darocure 1173, 1164, 2273, 1116, 2959, 3331 (EM Industries) and Igracure 651 and 184 (Ciba-Geigy), and the like. Generally, the initiator will be employed in the monomeric mixture at a concentration of about 0.01 to 1 percent by weight of the total mixture.

Polymerization of the mixtures will yield a polymer, that when hydrated, forms a hydrogel. Generally, the mixture will contain the copolymer in an amount ranging from about 0.1 to about 50 weight percent, preferably from about 0.25 to about 30 weight percent, and most preferably from about 1 to about 10 weight percent, based on the total weight of the mixture, and the biomedical device-forming comonomer in an amount ranging from about 50 to about 99.9 weight percent, preferably from about 70 to about 99.75 weight percent, and most preferably from about 90 to about 99 weight percent, based on the total weight of the mixture.

When producing a hydrogel lens, the mixture may further include at least a diluent that is ultimately replaced with water when the polymerization product is hydrated to form a hydrogel. Generally, the water content of the hydrogel is greater than about 5 weight percent and more commonly between about 10 to about 80 weight percent. The amount of diluent used should be less than about 50 weight percent and in most cases, the diluent content will be less than about 30 weight percent. However, in a particular polymer system, the actual limit will be dictated by the solubility of the various monomers in the diluent. In order to produce an optically clear copolymer, it is important that a phase separation leading to visual opacity does not occur between the comonomers and the diluent, or the diluent and the final copolymer.

Furthermore, the maximum amount of diluent which may be used will depend on the amount of swelling the diluent causes the final polymers. Excessive swelling will or may cause the copolymer to collapse when the diluent is replaced with water upon hydration. Suitable diluents include, but are not limited to, ethylene glycol; glycerine; liquid poly(ethylene glycol); alcohols; alcohol/water mixtures; ethylene oxide/propylene oxide block copolymers; low molecular weight linear poly(2-hydroxyethyl methacrylate); glycol esters of lactic acid; formamides; ketones; dialkylsulfoxides; butyl carbitol; and the like and mixtures thereof.

If necessary, it may be desirable to remove residual diluent from the lens before edge-finishing operations which can be accomplished by evaporation at or near ambient pressure or under vacuum. An elevated temperature can be employed to shorten the time necessary to evaporate the diluent. The time, temperature and pressure conditions for the solvent removal step will vary depending on such factors as the volatility of the diluent and the specific monomeric components, as can be readily determined by one skilled in the art. If desired, the mixture used to produce the hydrogel lens may further include crosslinking and wetting agents known in the prior art for making hydrogel materials.

The biomedical devices such as contact lenses obtained herein may be subjected to optional machining operations. For example, the optional machining steps may include buffing or polishing a lens edge and/or surface. Generally, such machining processes may be performed before or after the product is released from a mold part, e.g., the lens is dry released from the mold by employing vacuum tweezers to lift the lens from the mold, after which the lens is transferred by means of mechanical tweezers to a second set of vacuum tweezers and placed against a rotating surface to smooth the surface or edges. The lens may then be turned over in order to machine the other side of the lens.

The lens may then be transferred to an individual lens package containing a buffered saline solution. The saline solution may be added to the package either before or after transfer of the lens. Appropriate packaging designs and materials are known in the art. A plastic package is releasably sealed with a film. Suitable sealing films are known in the art and include foils, polymer films and mixtures thereof. The sealed packages containing the lenses are then sterilized to ensure a sterile product. Suitable sterilization means and conditions are known in the art and include, for example, autoclaving.

As one skilled in the art will readily appreciate, other steps may be included in the molding and packaging process described above. Such other steps can include, for example, coating the formed lens, surface treating the lens during formation (e.g., via mold transfer), inspecting the lens, discarding defective lenses, cleaning the mold halves, reusing the mold halves, and the like and combinations thereof.

The following examples are provided to enable one skilled in the art to practice the invention and are merely illustrative of the invention. The examples should not be read as limiting the scope of the invention as defined in the claims.

In the examples, the following abbreviations are used.

I2D5S4H: A methacrylate-capped prepolymer derived from isophorone diisocyanate, diethylene glycol and $\alpha,\omega$-bis-hydroxybutyl polydimethylsiloxane of Mn 4000 at a moloar ratio of 8:2:5 and end-capped with 2-hydroxyethyl methacrylate.

TRIS: tris(trimethylsiloxy)silylpropyl methacrylate

NVP: N-vinyl-2-pyrrolidone

DMA: N,N-dimethyl acrylamide

VDMO: vinyldimethyloxazolone

HEMA: 2-hydroxyethyl methacrylate

HEMAVC: methacryloxyethyl vinyl carbonate

D1173: 2-hydroxy-2-methyl-1-phenylpropan-1-one (available as Darocur 1173 initiator)

IMVT: 1,4-bis(4-(2-methacryloxyethyl)phenylamino)anthraquinone

PP: polypropylene

THF: tetrahydrofuran.

I2D5S4.8H: A methacrylate-capped prepolymer derived from isophorone diisocyanate, diethylene glycol and $\alpha,\omega$-bis-hydroxybutyl polydimethylsiloxane of Mn 4800 at a moloar ratio of 8:2:5 and end-capped with 2-hydroxyethyl methacrylate DBTDL: dibutyltin dilaurate IPA: isopropyl alcohol

EXAMPLE 1

Synthesis of Poly(glyceryl methacrylate-co-octafluoropentyl methacrylate) ("P(GM-co-OFPMA)").

To a three-neck 500 l flask equipped with condenser and nitrogen inlet tube was added glyceryl methacrylate (9.724 g; 60.711 mmol), THF (200 ml), 1H, 1H, 5H-octafluropentyl methacrylate (4.481 g; 14.927 mmol), and AIBN (0.214 g; 1.303 mmol). The contents were bubbled vigorously with nitrogen for 20 minutes. They were then heated to reflux under the constant nitrogen flow overnight. A white product precipitated on the second day. The product was recovered by removal of solvent.

EXAMPLE 2 AND COMPARATIVE EXAMPLE A

Preparation of a contact lens.

Mixtures were made by mixing the following components listed in Table 1, at amounts per weight.

TABLE 1

| Ingredient (amount in weight) | Ex. 2 | Comp. Ex. A |
|---|---|---|
| I2D5S5H | 40 | 40 |
| TRIS | 20 | 20 |
| DMA | 8 | 8 |

TABLE 1-continued

| Ingredient (amount in weight) | Ex. 2 | Comp. Ex. A |
|---|---|---|
| NVP | 27 | 27 |
| HEMAVC | 1 | 1 |
| Hexanol | 10 | 10 |
| Vazo-64 | 0.5 | 0.5 |
| P(GM-co-OFPMA) of Example 1 | 1 | 0 |
| IMVT | 150 ppm | 150 ppm |

The resulting mixtures were cast into contact lenses by introducing the mixture to a mold assembly composed of a PP mold for the anterior surface and a PP mold for the posterior surface and thermally curing the mixture at 100° C. for 2 hours. The resulting contact lens of Example 2 formed with the copolymer of Example 1 was released from the mold relatively more easily than the contact lens of Comparative Example A formed in the absence of the copolymer of Example 1.

EXAMPLE 3

Preparation of isocyanatoethyl methacrylate functionalized Poly(glyceryl methacrylate-co-octafluoropentyl methacrylate).

To a three-neck 100 ml flask equipped with condenser, and nitrogen inlet tube, was added glyceryl methacrylate (2.746 g; 17.146 mmol), methanol (50 ml), 1H, 1H, 5H-octafluoropentyl methacrylate (1.261 g; 4.199 mmol), and AIBN (0.068 g; (0.414 mmol)). The contents were bubbled with nitrogen vigorously for 20 minutes. Next, the mixture was heated under reflux with constant nitrogen flow for two days. The solvent was then removed first under reduced pressure and then under high vacuum for 3 hours to provide a white polymer solid. Anhydrous TMF (50 ml) was transferred to the flask containing the white polymer solid under the flowing of dry nitrogen and then DBTDL (0.04 g) and isocyanatoethyl methacrylate (0.6585 g; (4.244 mmol)) were added to the flask. The contents were then stirred at room temperature for two days under nitrogen purging. The solution was then dialyzed in 2500 ml 50/50 IPA/water solution using a cellulose ester dialysis film with a cut off molecular weight (number average) of 500 for 6 days. The macro monomer product was recovered by removing the solvent.

EXAMPLE 4 AND COMPARATIVE EXAMPLE B

Preparation of a silicone hydrogel lens.
Mixtures were made by mixing the following components listed in Table 2, at amounts per weight.

TABLE 2

| Ingredient (amount in weight) | Ex. 4 | Comp. Ex. B |
|---|---|---|
| I2D5S4.8H | 40 | 40 |
| TRIS | 20 | 20 |
| DMA | 8 | 8 |
| NVP | 27 | 27 |
| HEMAVC | 1 | 1 |
| Hexanol | 10 | 10 |
| Vazo-64 | 0.5 | 0.5 |
| Macro monomer of Example 3 | 1 | 0 |
| IMVT | 150 ppm | 150 ppm |

The resulting mixtures were cast into silicone hydrogel lenses by introducing the mixture to a mold assembly composed of a PP mold for the anterior surface and a PP mold for the posterior surface and thermally curing the monomer mixture at 100° C. for 2 hours. The resulting silicone hydrogel lens of Example 4 formed with the macro monomer of Example 3 was released from the mold relatively more easily than the silicone hydrogel lens of Comparative Example B formed in the absence of the macro monomer of Example 3. In addition, the silicone hydrogel lens of Example 4 formed with the macro monomer of Example 3 was optically clear.

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the features and advantages appended hereto.

What is claimed is:

1. A biomedical device obtained from a polymerization product of a mixture comprising (a) a copolymer which is the reaction product of one or more polymerizable polyhydric alcohols and one or more polymerizable fluorine-containing monomers; and (b) a biomedical device-forming comonomer.

2. The biomedical device of claim 1, wherein the polymerizable polyhydric alcohol is a polyhydric alcohol terminated with a polymerizable ethylenically unsaturated radical and the polymerizable fluorine-containing monomer is a fluorine-containing monomer terminated with a polymerizable ethylenically unsaturated radical.

3. The biomedical device of claim 1, wherein the polymerizable polyhydric alcohol is selected from the group consisting of polymerizable glycerol, polymerizable erythritol, polymerizable xylitol, polymerizable sorbitol and mixtures thereof.

4. The biomedical device of claim 1, wherein the polymerizable polyhydric alcohol is selected from the group consisting of glycerol (meth)acrylate, erythritol (meth)acrylate, xylitol (meth)acrylate, sorbitol (meth)acrylate and mixtures thereof.

5. The biomedical device of claim 1, wherein the polymerizable fluorine-containing monomer is a fluorinated (meth) acrylate monomer.

6. The biomedical device of claim 1, wherein the polymerizable fluorine-containing monomer is selected from the group consisting of 2,2,2-trifluoroethyl (meth)acrylate, 2,2, 3,3-tetrafluoropropyl (meth)acrylate, 2,2,3,3,3,-pentafluoropropyl (meth)acrylate, 1-trifluoromethyl-2,2,2-trifluoroethyl (meth)acrylate, 1H,1H,5H-octafluoropentyl (meth)acrylate, hexafluoroisopropyl (meth)acrylate, 2,2,3,3,4,4-hexafluorobutyl (meth)acrylate and mixtures thereof.

7. The biomedical device of claim 1, wherein the copolymer is terminated with an ethylenically unsaturated-containing radical.

8. The biomedical device of claim 1, wherein the biomedical device-forming comonomer is a silicone-containing monomer.

9. The biomedical device of claim 1, wherein the mixture further comprises a hydrophilic monomer, hydrophobic monomer or both.

10. The biomedical device of claim 9, wherein the hydrophilic monomer is selected from the group consisting of 2-hydroxyethylmethacrylate, 2-hydroxyethylacrylate, glyceryl methacrylate, N-vinyl pyrrolidone, N-vinyl-N-methyl acetamide, N, N-dimethyl methacrylamide, N,N-dimethylacrylamide, acrylic acid, methacrylic acid and mixtures thereof.

11. The biomedical device of claim 9, wherein the hydrophobic monomer is a silicone-containing monomer having from 1 to about 20 silicon atoms.

12. The biomedical device of claim 11, wherein the silicone monomer is 3-methacryloxypropyl tris(trimethylsiloxy) silane.

13. The biomedical device of claim 9, wherein the hydrophobic monomer is an aliphatic ring containing monomer selected from the group consisting of isobornyl acrylate, isobornyl methacrylate, cyclohexyl acrylate, cyclohexyl methacrylate and mixtures thereof.

14. The biomedical device of claim 1, wherein component (a) comprises about 0.1 to about 50 weight percent of the mixture and the biomedical device-forming comonomer component (b) comprises about 50 to about 99.9 weight percent of the mixture.

15. The biomedical device of claim 1, wherein component (a) comprises about 0.25 to about 30 weight percent of the mixture and the biomedical device-forming comonomer component (b) comprises about 70 to about 99.75 weight percent of the mixture.

16. The biomedical device of claim 1, wherein component (a) comprises about 1 to about 10 weight percent of the mixture and the biomedical device-forming comonomer component (b) comprises about 90 to about 99 weight percent of the mixture.

17. The biomedical device of claim 1, which is an ophthalmic lens.

18. The biomedical device of claim 17, wherein the ophthalmic lens is a contact lens.

19. The biomedical device of claim 18, wherein the contact lens is a rigid gas permeable lens.

20. The biomedical device of claim 1, which is a hydrogel.

* * * * *